W. G. BAIRD.
FLY TRAP.
APPLICATION FILED MAY 29, 1914.

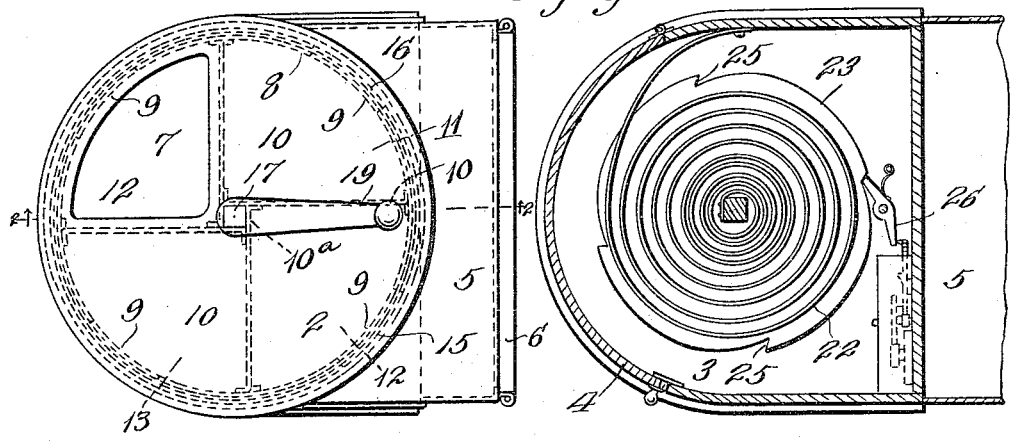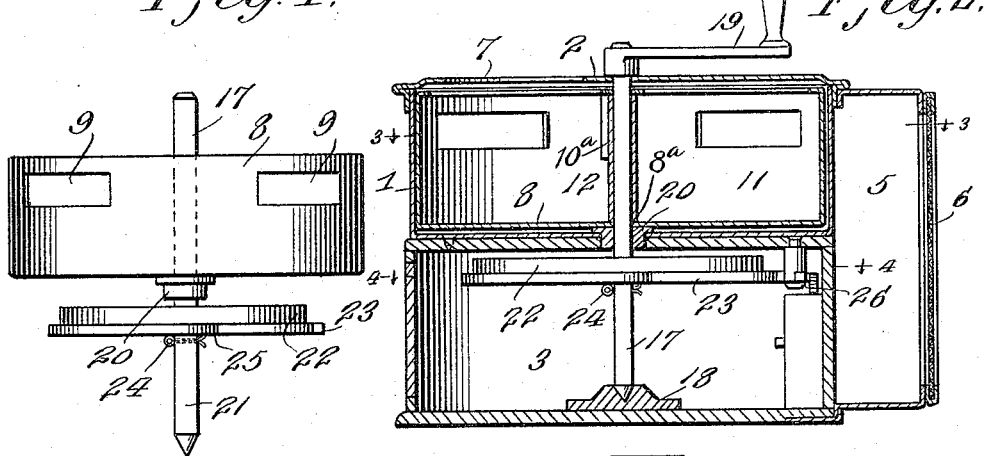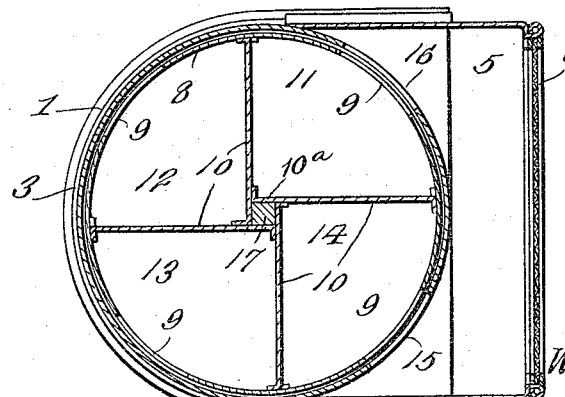

1,182,622.

Patented May 9, 1916.
2 SHEETS—SHEET 2.

Witnesses
Frank Hough
C. C. Hines.

Inventor
William G. Baird,
By Victor J. Evans
Attorney

UNITED STATES PATENT OFFICE.

WILLIAM G. BAIRD, OF FAIRFIELD, ILLINOIS.

FLY-TRAP.

1,182,622.

Specification of Letters Patent. Patented May 9, 1916.

Application filed May 29, 1914. Serial No. 841,878.

*To all whom it may concern:*

Be it known that I, WILLIAM G. BAIRD, a citizen of the United States, residing at Fairfield, in the county of Wayne and State of Illinois, have invented new and useful Improvements in Fly-Traps, of which the following is a specification.

This invention relates to fly traps, and its primary object is to provide an automatic trap of neat appearance and sanitary character, and which may be operated at fixed periods by motor mechanism, whereby the attracted flies will be entrapped.

A further object of the invention is to provide a trap which may be made of any desired size for automatic or other uses, and which is composed of parts capable of being readily assembled in the production of the trap, and as readily disassembled to permit the trap to be cleaned or repairs to be easily made.

The invention consists of the features of construction, combination and arrangement of parts herein fully described and claimed, reference being had to the accompanying drawings in which:—

Figure 6:
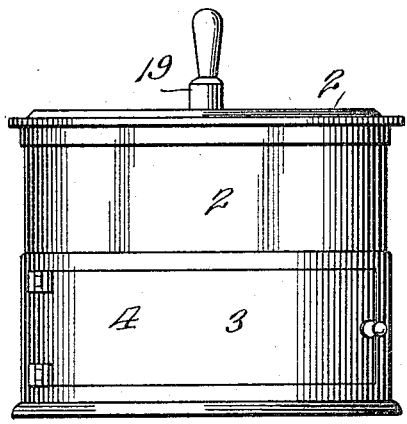
Figure 7:
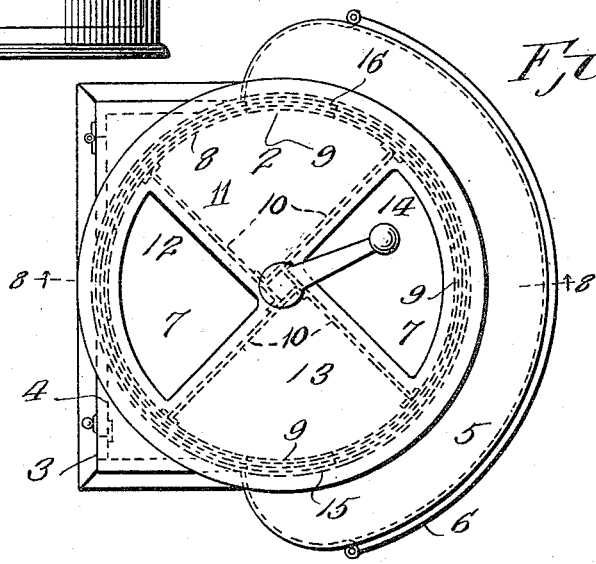
Figure 8:
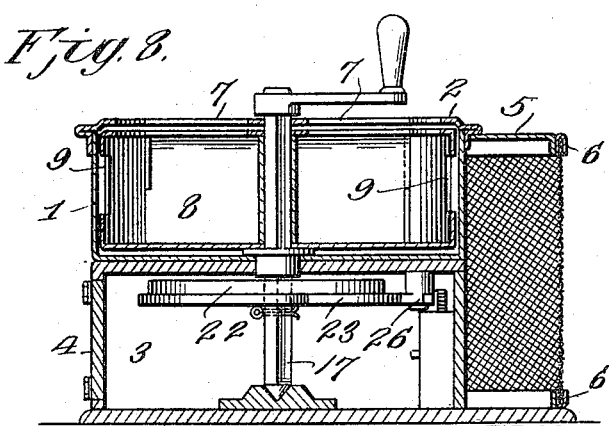

Figure 1 is a top plan view of one form of fly trap embodying my invention. Fig. 2 is a central vertical section on the line 2—2 of Fig. 1. Fig. 3 is a horizontal section on the line 3—3 of Fig. 2. Fig. 4 is a horizontal section on the line 4—4 of Fig. 2. Fig. 5 is a view in elevation of the rotary trap member and allied parts. Fig. 6 is an outer end elevation of the trap. Fig. 7 is a top plan view showing a slightly different form or modification of the invention. Fig. 8 is a section similar to Fig. 3 of the structure shown in Fig. 7.

Referring to Figs. 1 to 6, inclusive, of the drawings, 1 designates the outer casing having a removable lid or cover 2, said casing being suitably secured to the top of a box or compartment 3 designed to contain a suitable clockwork mechanism, not shown. This box or compartment 3 is provided at the front with a door 4, whereby access to the parts contained therein may be readily obtained. At the side of the trap diametrically opposite the door 4 a cage or chamber 5 is arranged, which is preferably coextensive in depth with the casing and box or base compartment. This cage 5 is formed to snugly engage the adjacent surfaces of the casing and box or base compartment and is preferably fastened to the cover 2 for removal therewith. The inner side of the cage is open and closed by the casing and box, while the outer side thereof is preferably formed of a hinged section or door composed of a frame having a transparent panel or cover with wire cloth or other light transmitting material. The said side or door 6 is provided with suitable means for securing it in closed position, and by the construction described is rendered of a sufficiently transparent character to form a lighted compartment serving as a lure. The door 6 may be opened for the removal of the entrapped flies when it is not desired to detach the cover and cage from the trap body, and said door also serves as a means whereby the interior of the cage may be cleaned in a convenient manner when desired.

The top 2 is provided with an entrance slot or passage 7 communicating with the interior of the casing 1, within which is disposed a rotary trap member 8. This rotary trap member 8 comprises a cylinder having a series of outlet openings 9 in its side wall, and provided with partition 10 forming compartments equal in number to said outlets. In the present instance the rotary trap member is shown as provided with four such radial compartments 11, 12, 13 and 14, which are equal in number to the outlets 9, and with which such outlets respectively communicate. The said compartments are open at the top and designed to be successively brought, by the rotation of the member 8, beneath the entrance opening 7 in the cover 2, and the outlets 9 are designed to successively register with outlets 15 and 16 formed in the side of the casing 1 facing the cage and providing a final outlet from the trap body for the passage of the flies to the interior of the cage 5.

The shaft 17 extends vertically through the casing, box and rotary member and has a conical lower end journaled in a bearing 18 on the bottom of the box, and is provided at its upper end with a crank handle 19. The intermediate portion of the shaft turns in a bearing 20, externally of an angular form which fits within an angular opening in the top of the box 3, while the upper end of the shaft is cylindrical and journaled in a bearing opening in the cover 2. The shaft is provided with an angular body portion 21, and the bottom of the rotary member 8 and partitions 10 are respectively provided with an angular opening 8ª and arranged to form an angular collar 10ª to fit such angular portion of the shaft, whereby the rotary member 8 is coupled to the shaft to rotate therewith, while said rotary member and the collar 20 are at the same time slidably engaged with the shaft, so as to allow the shaft to be withdrawn under certain conditions to permit ready disassemblage of the parts. Arranged within the upper portion of the box 3 is a coiled motor spring 22, which is fixed at one end to the shaft, and at its opposite end to the box. This spring is adapted to be wound by the rotation of the shaft through the medium of the crank handle 19, and is disposed between the top wall of the box and a ratchet wheel or disk 23. This ratchet wheel or disk has an angular opening for passage of the angular portion 21 of the shaft, whereby it is coupled to the shaft to rotate therewith, and said ratchet wheel or disk is held and supported in position by a fastening pin or key 24. Upon removing this pin or key, to which access is afforded through the door 4, the shaft 17 may be withdrawn endwise in an upward direction, thus allowing the cover, and parts to be disassociated in a ready and convenient manner for repairs, cleaning or other purposes. The periphery of the ratchet wheel is provided with ratchet teeth or notches 25 equal in number to and corresponding in arrangement with the outlets 9 in the rotary trap member 8, and these ratchet members or notches are adapted for coöperation with a pawl or dog 26, whereby the shaft and rotary member 8 are adapted, in the rotation of said parts, to be locked successively at different points in their path of rotation to hold the same fixed when the outlets 9 are in registry with the outlets 15 and 16 in the casing. The dog or pawl 26 is designed in practice to be automatically controlled by means of the escapement of a suitable clock work mechanism, not shown, which is inclosed within the box or compartment 3, and which may be of any suitable construction for the purpose.

In the use of the trap, the compartments 11, 12, 13 and 14 of the rotary trap member 8 are suitably baited and the motor spring wound for action. By the action of the clock work mechanism the dog or pawl 26 will be operated at predetermined intervals to permit the motor spring to impart a quarter revolution to the rotary member 8, whereby the respective compartments are intermittently brought into communication with the outlets 15 and 16. One of the compartments of the member 8 is thus constantly in register with the inlet 7 in the cover, and through this inlet the flies, attracted by the bait, are lured into the compartments of the rotary member. As these compartments come into registry with the final outlets 15 and 16, the flies, being attracted by the light from the cage 5, will pass through the registering outlets 9 and 15 and 16 into the cage during the interval of rest of the rotary trap member, the closure of the outlets 15 and 16 by rapid rotation of the rotary member when next released cutting off the light from the compartments of said rotary member and deterring the flies from returning thereto. The trap being constantly in action, it will be evident that in the course of time a large number of flies will be collected in the cage 5, from which they may be removed in an obvious manner and destroyed.

It will, of course, be understood that instead of two final outlets 15 and 16, but a single final outlet need be employed. It is however desirable under some conditions to employ not only two final outlets but two entrances 7, as shown in Figs. 7 and 8, in which case it will be understood that two of the compartments in the rotary trap member will always be in registry with the entrances 7, while the other two compartments will be in registry with the final outlets 15 and 16. These and other modifications falling within the scope of the appended claims may be made without departing from the spirit or sacrificing any of the advantages of the invention.

I claim:—

1. A fly trap comprising a circular casing having an outlet in its side and provided with a cover having an inlet opening, a lighted cage having a segmental inner portion receiving and embracing that side of the casing provided with the outlet, said cage having a door in its outer side, a rotary member within the casing, mounted to turn upon an axis at the center of said casing, said rotary member comprising a circular body divided by radial partitions into a series of compartments, said compartments being open at the top for communication with the inlet in succession as the rotary member revolves, and each of said compartments being provided with a side outlet for successive communication with the outlet of the casing as the rotary member revolves, and means for rotating the rotary member.

2. A fly trap comprising a circular casing having an outlet in its side and provided with a cover having an inlet opening, a lighted cage comprising a segmental body portion receiving and embracing that side of the casing provided with the outlet, said cage having a doorway in its outer side and a removable segmental foraminous door for closing said doorway, a rotary member within the casing mounted to turn upon an axis at the center of said casing, said rotary member comprising a circular body divided by radial partitions into a series of compartments, said compartments being open at the top for communication with the inlet in succession as the rotary member revolves, and each of said compartments being provided with a side outlet for successive communication with the outlet of the casing as the rotary member revolves, and means for rotating the rotary member.

3. A fly trap including a base, a circular casing mounted upon the base, said casing being provided in its side with an outlet, a removable cover closing the top of the casing and provided with an inlet, said inlet being located at a point adjacent to the side of the cage diametrically opposite said outlet, a lighted cage arranged exteriorly of the base and casing and in communication with said outlet and provided with a door for the removal of the captured flies, a rotary member within the casing provided with a central angular sleeve and a series of radial partitions forming compartments each adapted to communicate in turn with the inlet in the lid or cover and each provided with an outlet adapted to communicate in turn with the outlet of the casing, and a shaft having bearing in the base and casing of the cover and provided with an angular portion engaging said angular sleeve, and slidably withdrawable from engagement with said sleeve.

In testimony whereof I affix my signature in presence of two witnesses.

WILLIAM G. BAIRD.

Witnesses:
U. F. JOHNSON,
CHAS. W. CREIGHTON.

Copies of this patent may be obtained for five cents each, by addressing the "Commissioner of Patents, Washington, D. C."